(12) United States Patent
Yasuma (10) Patent No.: US 8,312,155 B2
(45) Date of Patent: Nov. 13, 2012

(54) SERVICE PUBLICATION RESTRICTION APPARATUS, METHOD, AND COMPUTER-READABLE STORAGE MEDIUM

(75) Inventor: Kensuke Yasuma, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 420 days.

(21) Appl. No.: 11/942,617

(22) Filed: Nov. 19, 2007

(65) Prior Publication Data

US 2008/0126550 A1     May 29, 2008

(30) Foreign Application Priority Data

Nov. 28, 2006 (JP) .................. 2006-320247
May 28, 2007 (JP) .................. 2007-140568

(51) Int. Cl.
*G06F 15/16* (2006.01)
(52) U.S. Cl. .............. 709/229; 709/203; 726/4
(58) Field of Classification Search ........... 713/201; 709/203, 229
See application file for complete search history.

(56) References Cited

U.S. PATENT DOCUMENTS

| 2003/0018710 A1* | 1/2003 | Choi .................. 709/203 |
| 2005/0021786 A1* | 1/2005 | Kikkawa et al. ........... 709/229 |
| 2005/0055576 A1* | 3/2005 | Mononen et al. .......... 713/201 |
| 2006/0056426 A1* | 3/2006 | Wakameda et al. ......... 370/401 |

FOREIGN PATENT DOCUMENTS

| JP | 2002-300191 A | 10/2002 |
| JP | 2004-118623 A | 4/2004 |
| JP | 2004-343420 A | 12/2004 |
| JP | 2005-135002 A | 5/2005 |
| JP | 2006-099675 A | 4/2006 |

* cited by examiner

*Primary Examiner* — Yves Dalencourt
(74) *Attorney, Agent, or Firm* — Canon USA, Inc., IP Division (57) ABSTRACT

A service publication restriction apparatus includes a connection unit configured to connect the service publication restriction apparatus to a network and a restriction unit configured to restrict a publication of a service by a publication unit if the connected network is not a registered network.

14 Claims, 12 Drawing Sheets

| ROUTER MAC ADDRESS (NETWORK INFORMATION) | CONTROL LEVEL |
|---|---|
| 11:22:33:44:55:66 | 1 |
| 12:34:56:78:90:ab | 3 |
| aa:bb:cc:dd:ee:ff | 5 |

FIG. 7

```xml
<?xml version="1.0"?>
<Policy>
 <UPnP>
  <SSDP>on</SSDP>
  <SOAP>
   <X_getState>on</X_getState>
   <X_setCommand>off</X_setCommand>
  </SOAP>
  <GENA>off</GENA>
 </UPnP>
</Policy>
```

|      | ADDRESS     | NETWORK MASK  | NETWORK TYPE     |
|------|-------------|---------------|------------------|
| eth0 | 192.168.1.1 | 255.255.255.0 | PHYSICAL NETWORK |
| tap0 | 10.0.0.1    | 255.255.255.0 | LOGIC NETWORK    |
| tap1 | 10.0.1.1    | 255.255.255.0 | LOGIC NETWORK    |

FIG. 12

SERVICE PUBLICATION RESTRICTION APPARATUS, METHOD, AND COMPUTER-READABLE STORAGE MEDIUM

BACKGROUND OF THE INVENTION

1. Field of the Invention

The present invention relates to a service publication restriction apparatus, a method, and a program which are useful for restricting publication of a service.

2. Description of the Related Art

Conventionally, when an apparatus having a function for exposing or publishing a service on a network and accepting a request to execute a service is connected to a network, a service is exposed or published to the outside and a request for executing such a service is accepted. Japanese Patent Application Laid-Open No. 2004-118623 discusses a method in which, when an electronic apparatus is connected to a new network, use of information which the electronic apparatus stored while connected to another network is inhibited if the new network is different from another network. However, there is a problem that the electronic apparatus connected to the new network exposes undesirable information to the network connected in the past even if the use of such information is inhibited.

In case of a digital camera (i.e., the electronic apparatus), the network connected in the past can be a home network, and another network can be offered at a hotspot. When the digital camera is connected to the home network, it exposes a service to an associated apparatus or a personal computer (PC) which is connected to the home network. On the other hand, the digital camera can also expose a service to an irrelevant apparatus or PC when the digital camera is connected to a hotspot. This causes a problem.

SUMMARY OF THE INVENTION

The present invention is directed to an apparatus, a method, and a computer-readable storage medium storing a computer-executable program which are capable of restricting publication of a service when a connected network is not registered.

According to an aspect of the present invention, a service publication restriction apparatus includes a connecting unit configured to connect the service publication restriction apparatus to a network and a restricting unit configured to restrict publication of a service by a publishing unit if the connected network is not a registered network.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1:
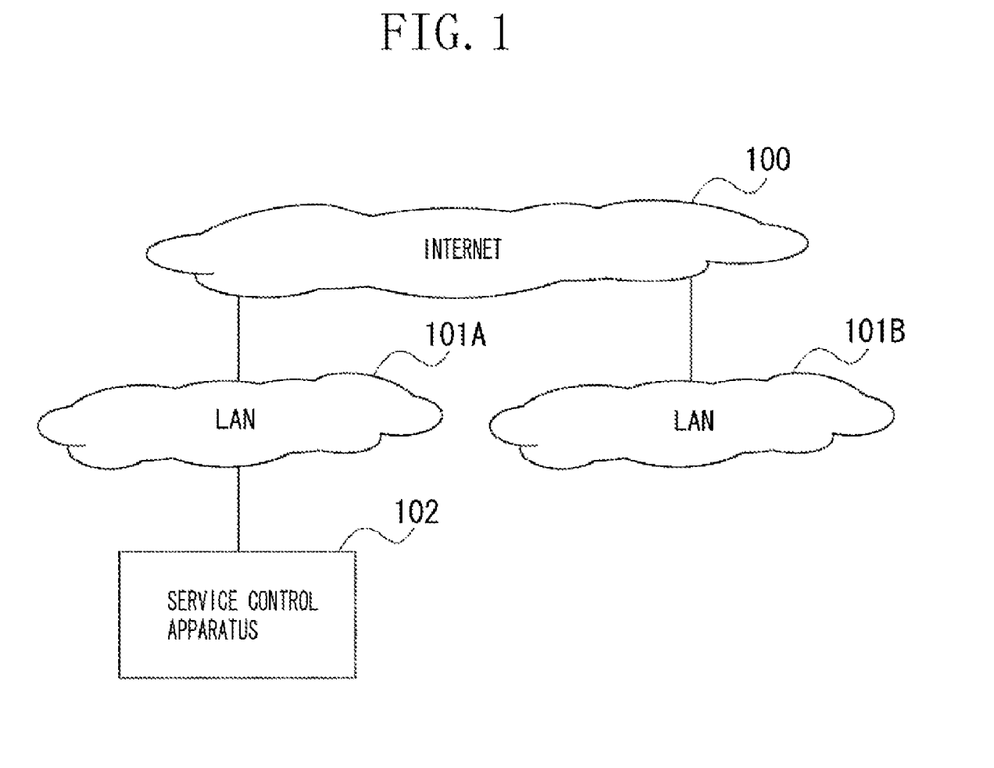
FIG. 1 illustrates a network configuration according to a first exemplary embodiment of the present invention.

FIG. 1 illustrates a network configuration according to a first exemplary embodiment of the present invention. In FIG. 1, an Internet 100 can be a single Wide Area Network (WAN), Local Area Network (LAN), or ad-hoc network. Alternatively, the Internet 100 can be a configuration of a combination of plural WANs, LANs, and ad-hoc networks as needed. The Internet in the present embodiment is only an example and can be a different communication network or a combination of communication networks.

A LAN 101A and a LAN 101B are connected to the Internet. The LAN according to the present embodiment is only an example and can be a different communication network or a combination of communication networks.

A service control apparatus 102 (service publication restriction apparatus) is configured to control a Universal Plug and Play (UPnP) device. The service control apparatus 102 is, for example, an apparatus configured to execute various types of services or an apparatus configured to provide such services. UPnP is a technology that enables advertisement, notification and provision of a service. UPnP in the present embodiment is only an example, and a service protocol such as Web Service, Web Services for Devices (WSD) or a combination of UPnP, Web Service, WSD and other service protocols can also be used.

In FIG. 1, a single service control apparatus 102 is connected to the LAN 101A. However, a plurality of service control apparatuses 102 can be connected to the LAN 101A. Further, in FIG. 1, the service control apparatus 102 is connected to a single LAN 101A. However, service control apparatus 102 can be connected to a plurality of LANs, WANs, ad-hoc networks, logic networks, or peer-to-peer networks.

The service control apparatus 102 (service publication restriction apparatus) according to the present embodiment is described with reference to FIG. 2. The service control apparatus 102 is a computer system which can be a personal computer (PC), a workstation, a notebook PC, or a palmtop PC. Further, the service control apparatus 102 can also be a home appliance of various types such as a computer integrated in a television set, a game machine having a communication function, a cellular phone or a personal handy phone system (PHS), that is, a terminal having a communication function that is used in communicating with other service control apparatuses. The service control apparatus 102 can also be implemented by a combination of such apparatuses.

A central processing unit (CPU) 201 controls the computer system. A random access memory (RAM) 202 functions as a main memory of the CPU 201 as well as a work area and a data area of an execution program.

A read only memory (ROM) 203 stores processing of an operation of the CPU 201. The ROM 203 includes a program ROM and a data ROM. The program ROM stores an operating system (OS) which is a system program configured to control an apparatus in the computer system. The data ROM stores information necessary in operating the computer system. A hard disk drive (HDD) 209, which is described below, can be used in place of the ROM 203.

A network interface (NETIF) 204 controls data transfer between computer systems or diagnoses a connection status of the computer systems via the network. The NETIF 204 connects the network (the LAN 101A) to the service control apparatus 102.

A video RAM (VRAM) 205 is used for loading an image which is displayed to indicate an operation status of the computer system on a screen of a cathode ray tube (CRT) 206 which will be described below, and is configured to control the display.

A controller 207 controls a signal input from an external input device 208. The external input device 208 is configured to accept an operation performed by a user of the computer system. The external input device 208 is, for example, a keyboard.

The HDD 209 is configured to store data such as an application program or image information.

A floppy disk drive (FDD) 210 is an external input/output device configured to input/output, for example, a compact disc read only memory (CD-ROM). The FDD 210 is used, for example, to read out information from a medium which stores the above-described application program. An application program or data stored in the HDD 209 can also be stored in the FDD 210.

An input/output bus 200, which serves as an address bus, a data bus, and a control bus, is used to transfer data between the above-described units.

A module configuration of the service control apparatus 102 (service publication restriction apparatus) of the present embodiment will be described with reference to FIG. 3.

A service control unit 301 controls reading/writing processing of network information stored in an information storage unit 302, controls determination made by a network determination unit 303, and controls UPnP processing performed by a UPnP processing unit 304. Further, the service control unit 301 performs registration and deletion of a network.

The information storage unit 302 stores network information and control level information of a network. The network determination unit 303 determines whether the currently-connected network is a registered network.

The UPnP processing unit 304 controls a Simple Service Discovery Protocol (SSDP) processing unit 305, a Simple Object Access Protocol (SOAP) processing unit 306, and a General Event Notification Architecture (GENA) processing unit 307. Further, the UPnP processing unit 304 connects the service control apparatus 102 to the network (LAN 101A).

The SSDP processing unit 305 is configured to perform a SSDP process. The SSDP processing unit 305 notifies the network (LAN 101A) that the service control apparatus 102 (or a service exposed by the service control apparatus 102) is present. The service provided by the service control apparatus 102 includes capturing of an image and exposing of stored image data. Although SSDP is used in the present embodiment, a protocol such as Web Services Dynamic Discovery (WS-Discovery) or the like can also be used. Further, a combination of SSDP and WS-Discovery can be used.

The SOAP processing unit 306 is configured to perform a SOAP process. The SOAP processing unit 306 accepts a request for executing of a service from the service control apparatus 102 through the network (LAN 101A). Although SOAP is used in the present embodiment, protocols such as Web Services Transfer (WS-Transfer) and Web Services Enumeration (WS-Enumeration) can also be used. Further, a combination of SOAP, WS-Transfer, and WS-Enumeration can be used.

The GENA processing unit 307 is configured to perform a GENA process. The GENA processing unit 307 notifies the network (LAN 101A) of a state of the service control apparatus 102. Although GENA is used in the present embodiment, protocols such as Web Services Eventing (WS-Eventing) and Web Services Notification (WS-Notification) can also be used. Further, a combination of GENA, WS-Eventing, and WS-Notification can be used.

Figure 2:
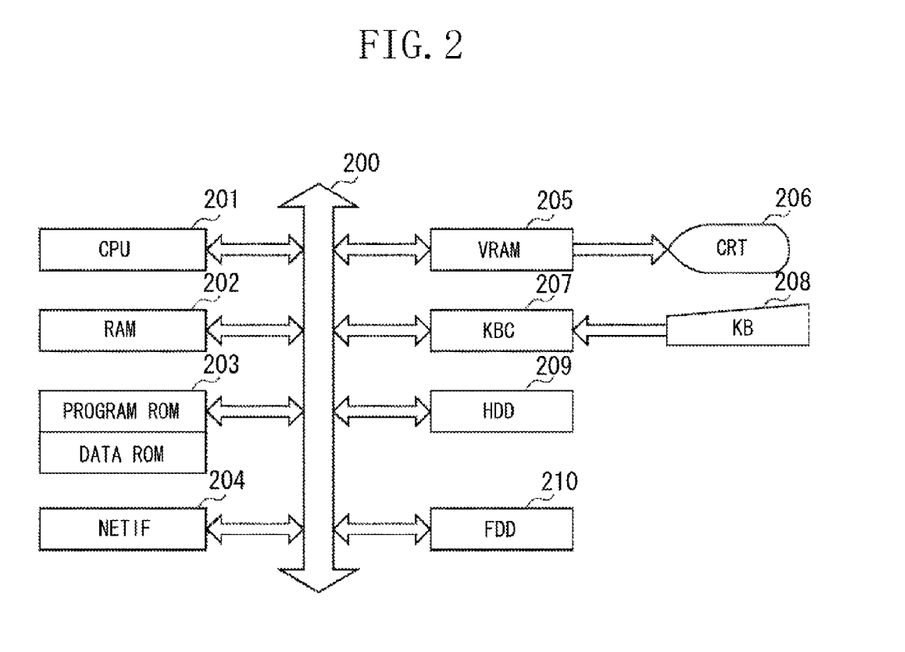
FIG. 2 is a system block diagram of a service control apparatus using a PC according to the first exemplary embodiment of the present invention.
Figure 3:
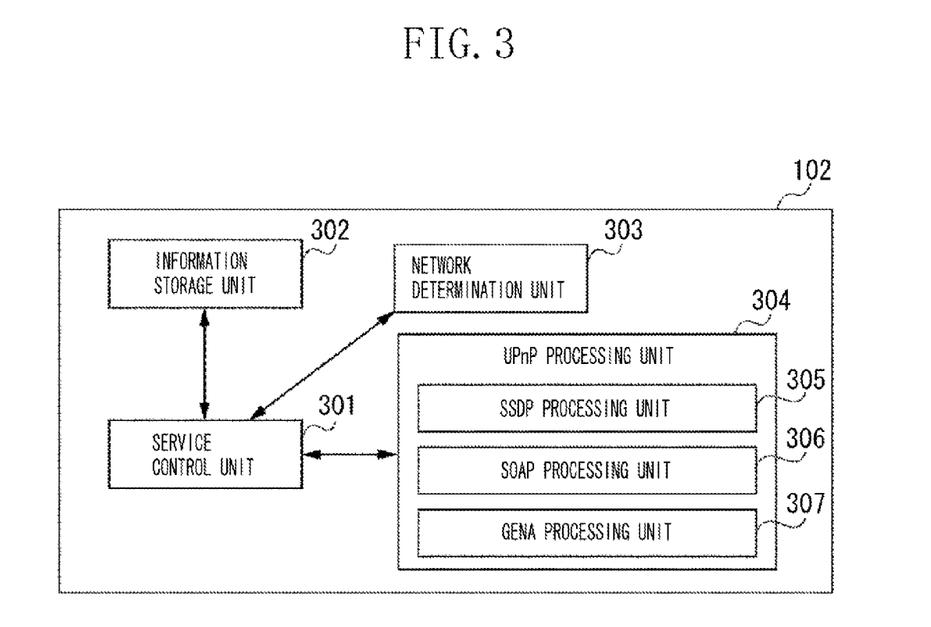
FIG. 3 illustrates a configuration of an internal module according to the first exemplary embodiment of the present invention.

The information storage unit 302 in FIG. 3 corresponds to the RAM 202, the HDD 209, and the FDD 210 in FIG. 2. The service control unit 301 and the network determination unit 303 in FIG. 3 are realized by the CPU 201. Further, the UPnP processing unit 304, the SSDP processing unit 305, the SOAP processing unit 306, and the GENA processing unit 307 are realized by the CPU 201 (and the NETIF 204 and the RAM 202).

The service control unit 301 restricts exposure of a service performed by the SSDP processing unit 305 as a UPnP device. Further, the service control unit 301 restricts acceptance of a request for executing a service provided by the SOAP processing unit 306 via the network (LAN 101A) from the service control apparatus 102 (restricts an execution of a service requested via the network). In addition, the service control unit 301 restricts a notification of the service by the SSDP processing unit 305 if the connected network is not a registered network.

Figure 6:
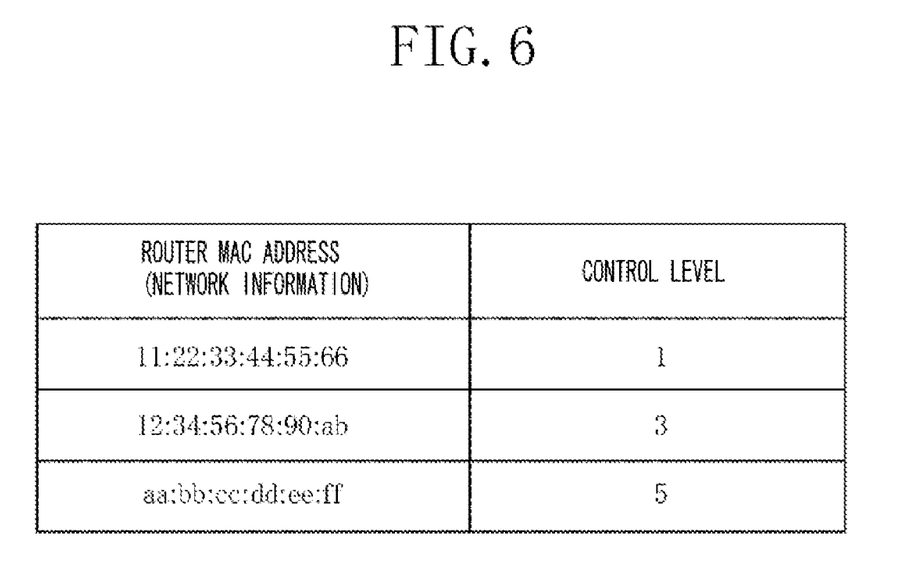
FIG. 6 is an example of network information and control level information according to the first exemplary embodiment of the present invention.

FIG. 6 illustrates an example of information stored in the information storage unit 302. The information storage unit 302 stores a Media Access Control (MAC) address of a router of the registered network and control level information of the registered network as a pair. It is determined whether a connected network is a registered network by comparing the MAC address of the connected router and the MAC address of the registered router. If the MAC addresses of the routers match with each other, the connected network is determined to be the registered network. For example, if a MAC address of a router of a connected network is 11:22:33:44:55:66, it is included in the network information in FIG. 6. Accordingly, the network is determined to be a registered network. A control level of this registered network is "1".

The MAC address of a router of the registered network is an example of network information. A registered network is determined by comparing the MAC addresses of the routers according in the present embodiment. However, the present invention is not limited to the MAC addresses. For example, router advisement of Internet Protocol version 6 (IPv6) or service set identifier (SSID) of Wireless LAN can also be used for the determination.

While a numeric value is used to express the control level according to the present embodiment, detailed service control of SSDP, SOAP, and GENA can also be written in a description language such as XML.

Figure 7:
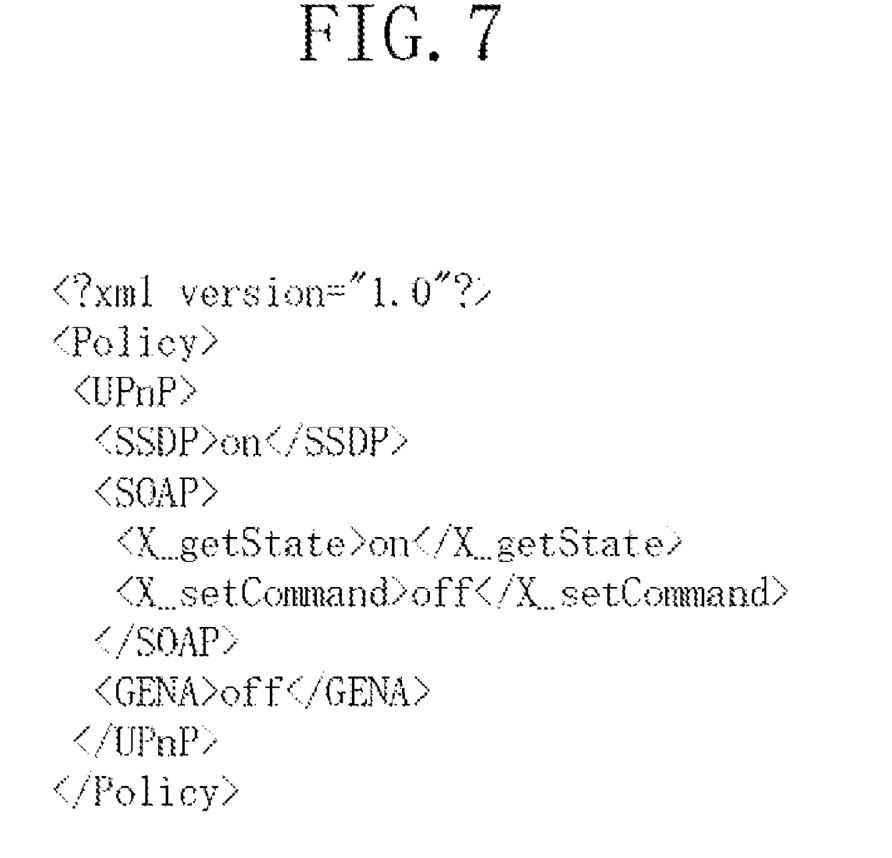
FIG. 7 is an example of a description of a control level written in Extensible Markup Language (XML) according to the first exemplary embodiment of the present invention.

FIG. 7 illustrates an example of control level information written in XML. The SSDP element expresses that the entire SSDP process is permitted. The SOAP element expresses that X_getState of SOAP is permitted but X_setCommand of SOAP is not permitted. The GENA element expresses that the entire GENA process is not permitted. In this way, restriction of the SSDP processing unit 305, the SOAP processing unit 306, and the GENA processing unit 307 can be described independently.

Next, an example of the service control apparatus 102 will be described which determines the network and controls the SSDP, SOAP, and GENA services. When the service control apparatus 102 is connected to a network, the service control apparatus 102 determines whether the connected network is a registered network. According to the present embodiment, the service control apparatus 102 acquires a MAC address of a router of the connected network to determine whether the current network matches with a MAC address of the rooter of the registered network (see FIG. 6).

If the currently-connected network is an unregistered network, the service control apparatus 102 determines whether to register the network. If the service control apparatus 102 determines that the network is not to be registered, the SSDP, SOAP, and GENA services will be prohibited by the service control apparatus 102. If the service control apparatus 102 determines to register the network, it registers a MAC address of the router, determines the control level of the network, and performs processing to be executed in a case of a registered network.

If the currently-connected network is a registered network, the service control apparatus 102 makes a determination according to the control level of the currently-connected network. According to the control level information, the service control apparatus 102 determines whether to permit all services, or restrict the services provided by SSDP, SOAP, or GENA. For example, according to the present embodiment, if a control level is "1", the service control apparatus 102 permits all processing, that is, exposure of the SSDP service, provision of the SOAP service, and registration and notification of the GENA service. If the control level is "3", the service control apparatus 102 restricts exposure of the service by SSDP but permits provision of the service by SOAP, and registration and notification of the service by GENA.

The exposure of a service by SSDP means that an apparatus spontaneously advertises a presence of a service. A provision of a service by SOAP means sending of a request to an apparatus using a message and providing a service to the apparatus according to a response from the apparatus. A registration and notification of a service by GENA means notifying to an apparatus in a case where information about the apparatus changes. Such an apparatus is registered in advance so that a notification is made when the change occurs within the apparatus.

Although SSDP, SOAP, and GENA are used in the present embodiment, exposure, provision, registration and notification of a service can be performed also by other protocols.

Figure 4:
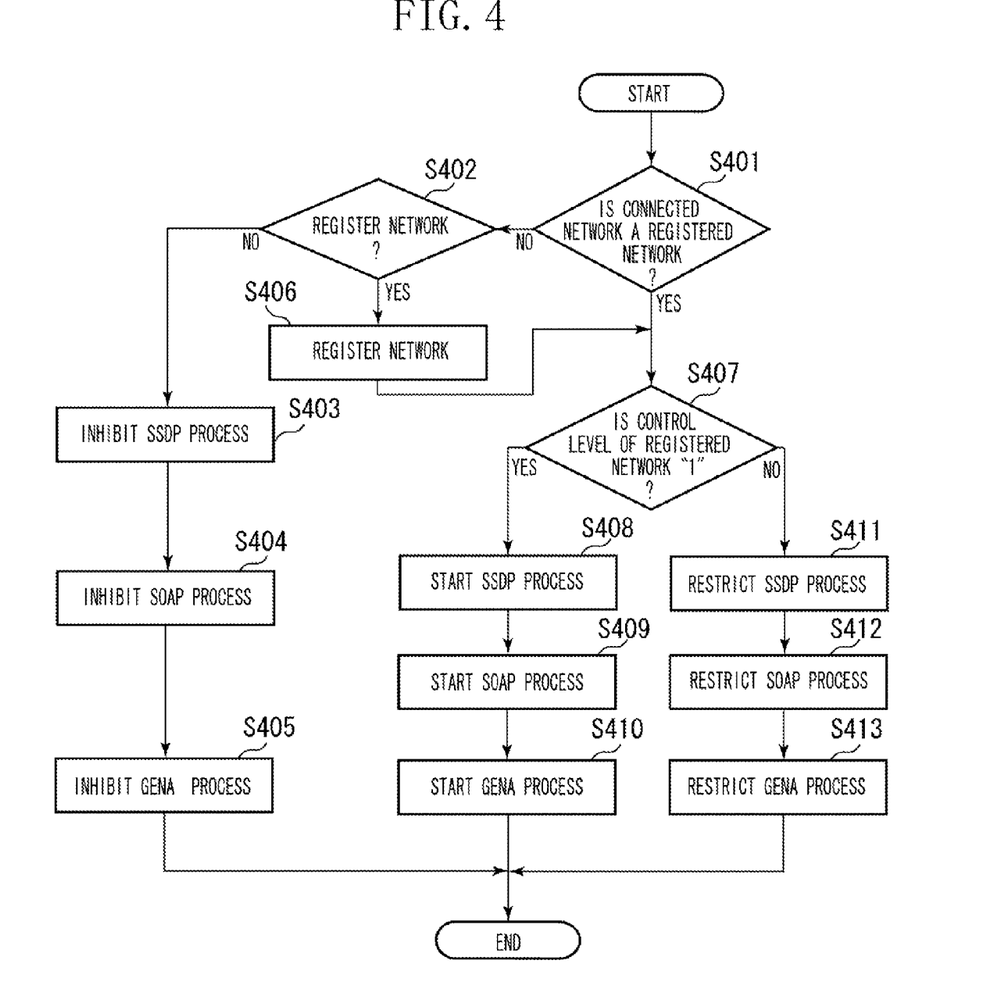
FIG. 4 is a flowchart illustrating a service control sequence according to the first exemplary embodiment of the present invention.

Next, control of a service performed by the service control apparatus 102 according to the present embodiment when it is connected to a network, is described with reference to the flowchart in FIG. 4. The service publication restriction program is stored in the HDD 209 so that the program can be read out by the CPU 201.

In step S401, the network determination unit 303 determines whether the connected network is a registered network based on a MAC address information of the router. The MAC address information of the router is stored in the information storage unit 302 and sent to the network determination unit 303. The information storage unit 302 stores network information. Then, the network determination unit 303 determines whether the connected network is a registered network by comparing the network information of the connected network and the network information stored in the information storage unit 302. If the network determination unit 303 determines that the connected network is the registered network (YES in step S401), the process proceeds to step S407. If the network determination unit 303 determines that the connected network is an unregistered network (NO in step S401), the process proceeds to step S402.

In step S402, the service control unit 301 determines whether to register the connected network. This determination is made based on an input (or application) from the external input device 208. If the service control unit 301 determines to register the connected network (YES in step S402), the process proceeds to step S406. If the service control unit 301 determines not to register the connected network (NO in step S402), the process proceeds to step S403.

In step S403, the service control unit 301 issues a command inhibiting the SSDP process to the UPnP processing unit 304. Then, the UPnP process unit 304 issues an inhibition command to the SSDP processing unit 305 so that the SSDP process is not performed. The SSDP processing unit 305 inhibits the SSDP process to be performed on the connected network, and the process proceeds to step S404. In this way, exposure (notification) of a service by the SSDP processing unit 305 is restricted if the connected network is not a registered network.

In step S404, the service control unit 301 issues a command inhibiting the SOAP process to the UPnP processing unit 304. Then, the UPnP processing unit 304 issues an inhibition command to the SOAP processing unit 306 so that the SOAP process is not performed. The SOAP processing unit 306 inhibits the SOAP process to be performed on the connected network, and the process proceeds to step S405. In this way, execution of a service requested via an unregistered network is restricted if the connected network is not a registered network.

In step S405, the service control unit 301 issues a command inhibiting the GENA process to the UPnP processing unit 304. Then, the UPnP processing unit 304 issues an inhibition command to the GENA processing unit 307 so that the GENA processing is not performed. The GENA processing unit 307 inhibits the GENA processing to be performed on the connected network, and then the process ends.

In step S406, the service control unit 301 registers the currently-connected network. Then, the service control unit 301 controls the information storage unit 302 to store the MAC address of the router, determines the control level, and controls the information storage unit 302 to store the control level information. Then, the process proceeds to step S407. The control level information can be input by the user using the external input device 208 (or by an application). For example, the user inputs control level "1" using the external input device 208.

In step S407, the service control unit 301 determines the control level of the registered network based on the control level information (see FIG. 6) stored in the information storage unit 302. If the control level of the registered network permits all processing (all processing is approved when the control level is "1" according to the present embodiment) (YES in step S407), the process proceeds to step S408. If the control level of the registered network is not permitted at a time but in stages (i.e. when the control level is "3" or "5" according to the present embodiment) (NO in step S407), the process proceeds to step S411.

In step S408, the service control unit 301 issues a command starting the SSDP process to the UPnP processing unit 304. Then, the UPnP processing unit 304 issues a command starting the SSDP process to the SSDP processing unit 305. In response to the command, the SSDP processing unit 305 starts the SSDP process on the connected network, and the process proceeds to step S409.

In step S409, the service control unit 301 issues a command starting the SOAP process to the UPnP processing unit 304. Then, the UPnP processing unit 304 issues a command starting the SOAP process to the SOAP processing unit 306. In response to the command, the SOAP processing unit 306 starts the SOAP process on the connected network, and the process proceeds to step S410.

In step S410, the service control unit 301 issues a command starting the GENA process to the UPnP processing unit 304. Then, the UPnP processing unit 304 issues a command starting the GENA process to the GENA processing unit 307. In response to the command, the GENA processing unit 307 starts the GENA process on the connected network, and then the process ends. In this way, if the connected network is a registered network, provision of the service is started.

In step S411, the service control unit 301 issues a start command including restriction of the SSDP process to the UPnP processing unit 304 according to the control level of the registered network. The UPnP processing unit 304 issues a start command including restriction of the SSDP process to the SSDP processing unit 305. The SSDP processing unit 305 restricts the SSDP process on the connected network, and the process proceeds to step S412. In this way, exposure (notification) of a service by the SSDP processing unit 305 is restricted according to a control level of the registered network.

In step S412, the service control unit 301 issues a start command including restriction of the SOAP process to the UPnP processing unit 304 according to the control level of the registered network. The UPnP processing unit 304 issues a start command including restriction of the SOAP process to the SOAP processing unit 306. The SOAP processing unit 306 restricts the SOAP process on the connected network and the process proceeds to step S413. In this way, execution of a service requested through the network is restricted according to a control level of the registered network.

In step S413, the service control unit 301 issues a start command including restriction of the GENA process to the UPnP processing unit 304 according to the control level of the registered network. The UPnP processing unit 304 issues a start command including restriction of the GENA process to the GENA processing unit 307. The GENA processing unit 307 restricts processing of the connected network with the GENA process, and then the process ends.

Figure 5:
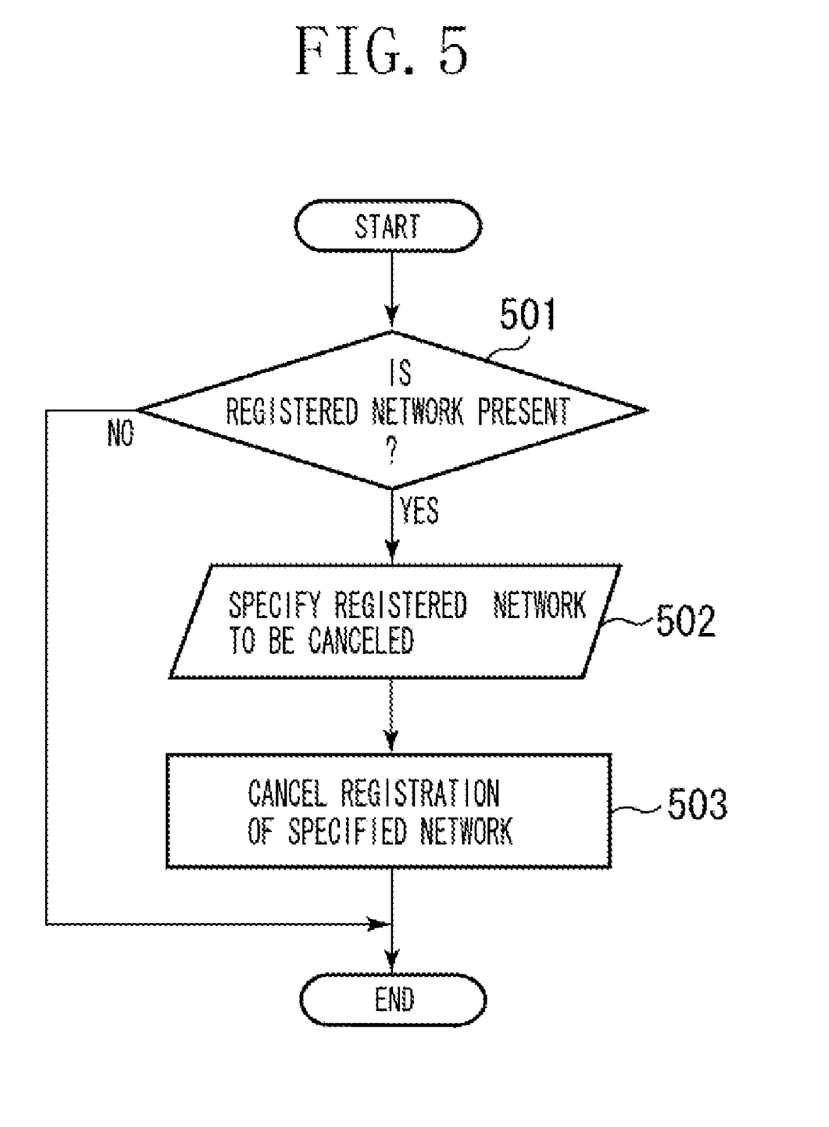
FIG. 5 is a flowchart illustrating a registration canceling sequence of a registered network according to the first exemplary embodiment of the present invention.

Next, a sequence of the service control apparatus 102 of the present embodiment for canceling a registered network is described with reference to the flowchart in FIG. 5.

In step S501, the service control unit 301 determines whether the registered network information is stored in the information storage unit 302. If the registered network information is stored (YES in step S501), the process proceeds to step S502. If the registered network information is not stored (NO in step S501), the process ends.

In step S502, the service control unit 301 specifies a registered network whose registration is to be cancelled. Then, the process advances to step S503. A registered network which is to be cancelled can be specified also by a user (or an application) when the user specifies the MAC address of a router registered in the information storage unit 302 using the external input device 208.

In step S503, the service control unit 301 cancels the registration of the specified registered network, deletes the information about the registered network which is stored in the information storage unit 302, and then the process ends. In this way, if the information of the registered network is stored in the information storage unit 302, the information about the registered network is deleted from the information storage unit 302 (control level information corresponding to the registered network is deleted).

According to the present embodiment, the user can safely connect an UPnP apparatus to a network. For example, if a public network which can be accessed at an access point such as a hotspot is set to be an unregistered network, advertisement of a presence of an UPnP apparatus can be prevented by inhibiting the SSDP process. The inhibition protects the UPnP apparatus from being noticed by a malicious third person. Next, by inhibiting the SOAP process, the UPnP apparatus can be protected from external operation. The inhibition of the SOAP process protects the UPnP apparatus from operation by a malicious third person. Further, by inhibiting the GENA process, notification of the UPnP apparatus to the outside can be prevented. Thus, notification of an apparatus state to a malicious third person from the UPnP apparatus can be restricted.

Further, by applying the present embodiment to an apparatus having a vulnerable interface (e.g., a digital camera, a printer), the user can reduce the number of settings required in connecting each network and easily use the apparatus.

Figure 8:
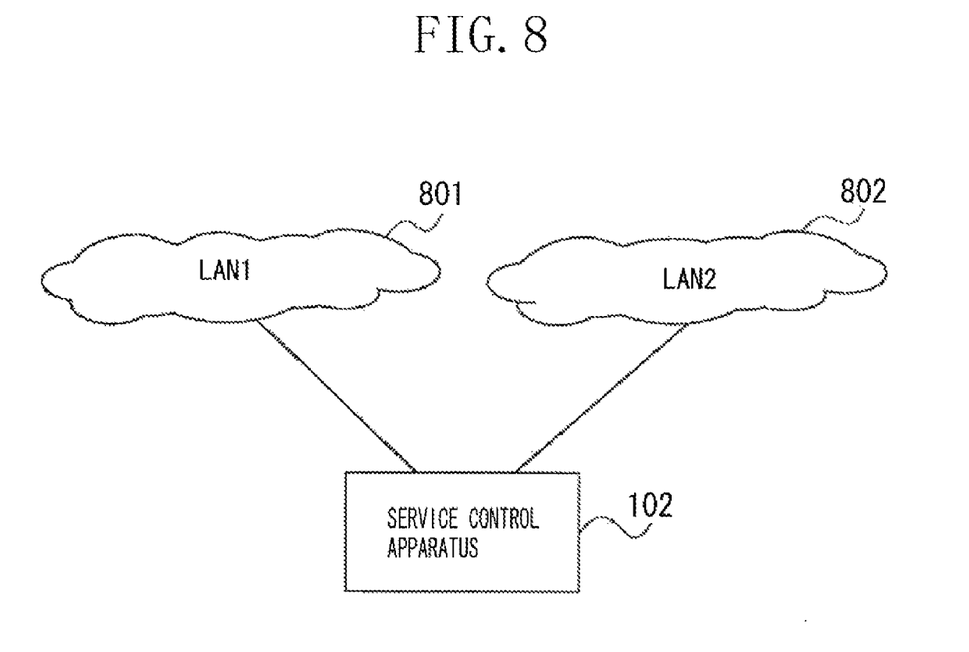
FIG. 8 illustrates a network configuration according to a second exemplary embodiment of the present invention.

FIG. 8 illustrates a network configuration according to a second exemplary embodiment of the present invention. In FIG. 8, a LAN 801 is a local area network, however, it can also be a WAN or an ad-hoc network. Further, the LAN 801 can be a different type of communication network.

A LAN 802 is a LAN different from the LAN 801. The LAN 802 can also be a WAN, or an ad-hoc network. Further, the LAN 802 is only an example and can be a different type of communication network.

In FIG. 8, the service control apparatus 102 is connected to two LANs. However, it can be connected to more than two LANs. Further, the service control apparatus 102 can be connected to a plurality of LANs at the same time. The service control apparatus 102 executes a sequence of a flowchart illustrated in FIG. 4 for each of a plurality of LANs.

As an example, a case will be described where the LAN 801 is a registered network having a control level of "1" and the LAN 802 is a registered network having a control level of "3". The service control apparatus 102 permits the LAN 801 having a control level of "1" to execute a process such as an exposure of a service performed by SSDP, a provision of a service by SOAP, a registration and a notification of a service by GENA. On the other hand, the service control apparatus 102 restricts an exposure of a service by SSDP to the LAN 802 having a control level of "3", but permits a provision of a service by SOAP and a registration and a notification of a service by GENA.

Figure 9:
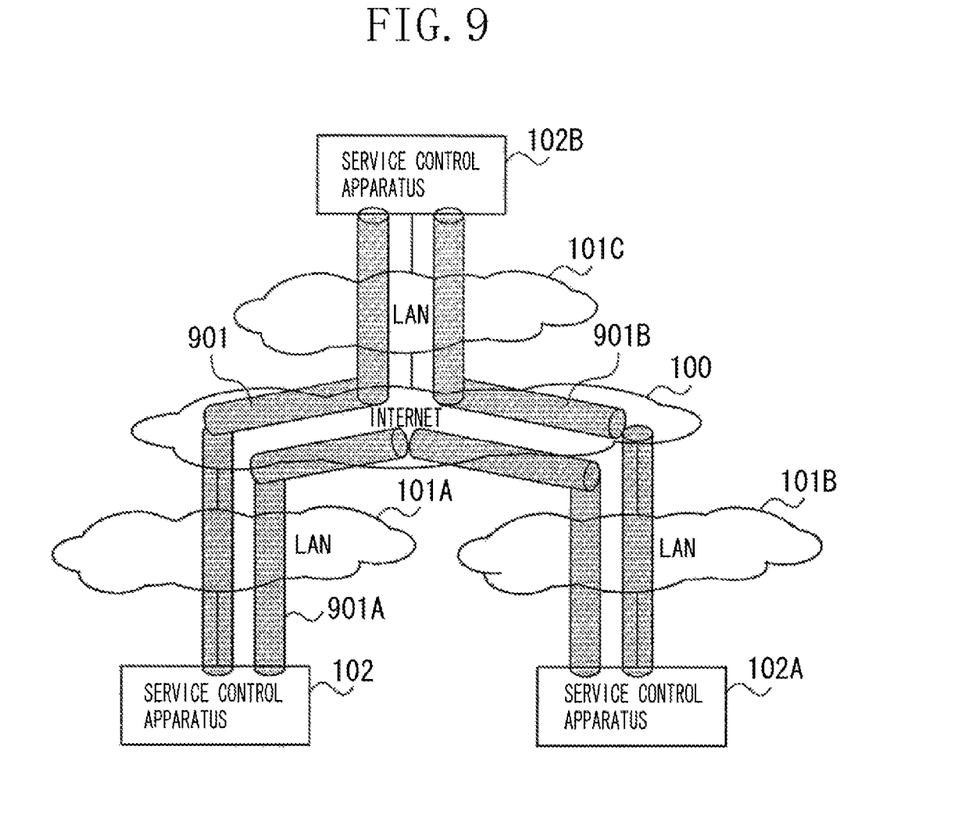
FIG. 9 illustrates a logic network on a physical network according to a third exemplary embodiment of the present invention.

FIG. 9 illustrates a logic network running on a physical network according to a third exemplary embodiment of the present invention.

According to the present embodiment, the service control apparatus 102 can be connected to a physical network and both of logic networks 901 and 901A at a time. The physical network according to the present embodiment is the LAN 101A which is physically connected. The logic network according to the present embodiment is a logically connected LAN using a Layer 2 Virtual Private Network (VPN), etc.

In FIG. 9, the service control apparatuses 102, 102A, and 102B are connected by the logic networks 901 and 901A, and a logic network 901B. One LAN is established by one or a plurality of the logic networks 901, 901A, and 901B. The present embodiment is described by using mesh networking. However, the connection of the physical network on the logic network can be other networking such as peer-to-peer based network or client-server based network.

The service control apparatus 102 (102A, 102B) has a network interface connected to a physical network 101 (101B, 10C) and a virtual network interface connected to the logic networks 901 and 901A (901B). The service control apparatus 102 determines whether the physical network or the logical network is used based on information about whether the network interface or the virtual network interface is used, or based on information about whether an address assigned to the physical network or assigned to the logical network is used. The present embodiment is further described with reference to FIGS. 10 and 12.

Figure 12:
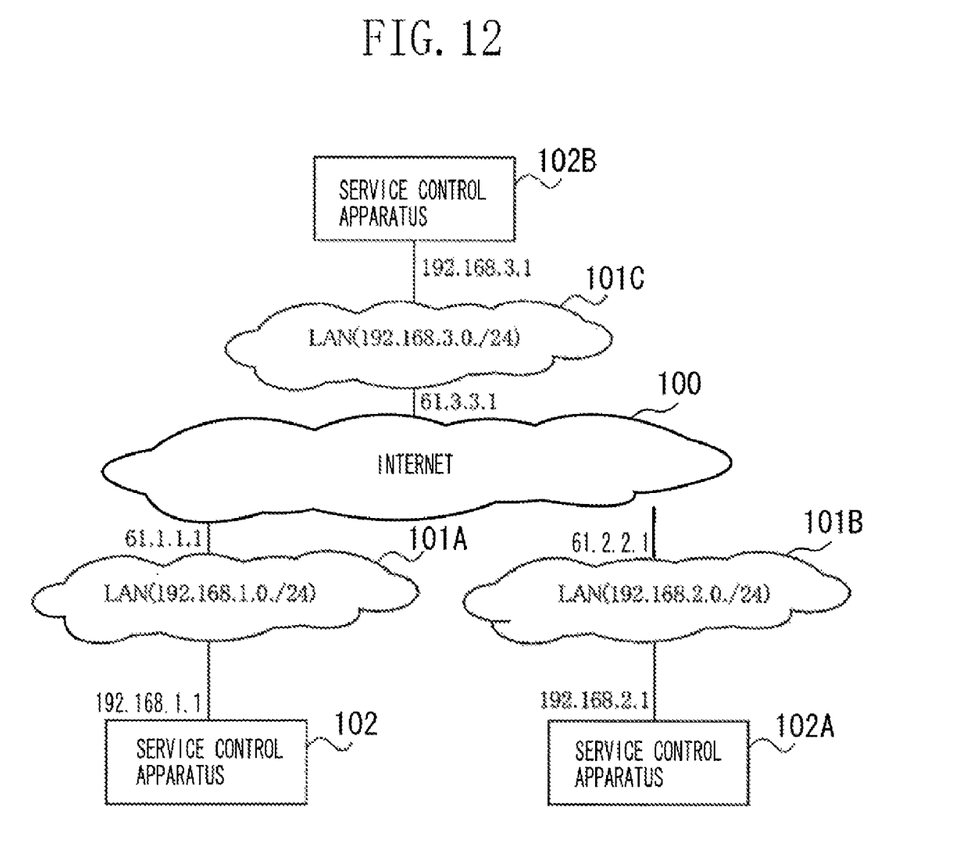
FIG. 12 illustrates a physical network configuration and an Internet Protocol (IP) address according to a third exemplary embodiment of the present invention.

When a service control apparatus 102 which has an IP address of 192.168.1.1 illustrated in FIG. 12 uses the physical network, the service control apparatus sends a frame 1000 (see FIG. 10) which is in a form routable via the physical network through the NETIF 204. If the network is connected using UPnP, a destination IP address of the frame 1000 will be 192.168.1.0/24 on the network and a source IP address will be 192.168.1.1.

Figure 10:
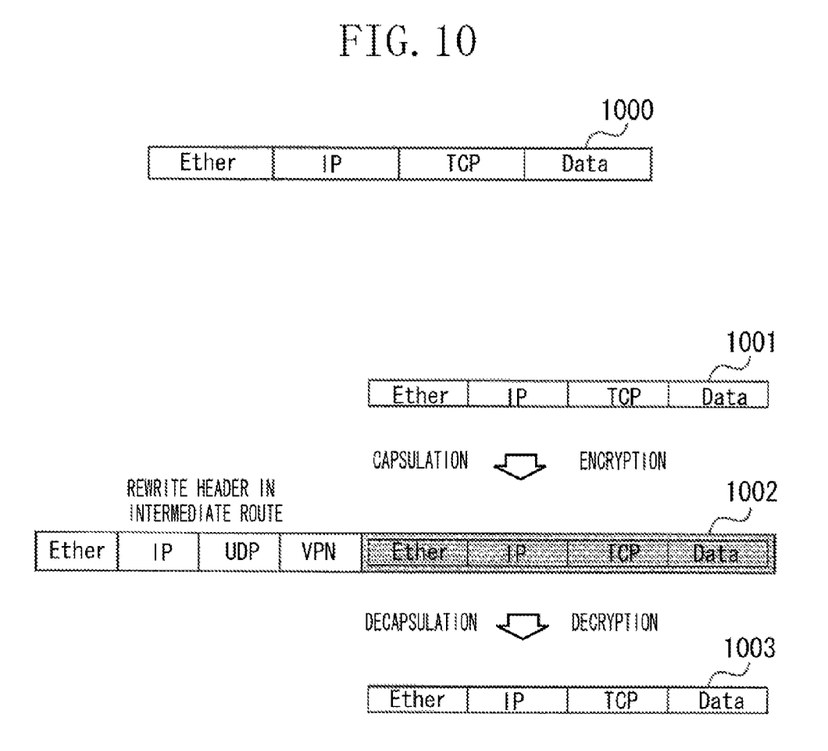
FIG. 10 illustrates capsulation and decapsulation of a packet sent via the logic network.

If the service control apparatus 102 uses a logic network of 10.0.0.0/24 (e.g., 901A), a destination IP address of a frame 1001 which is in a form routable via the logic network through a virtual network interface, will be 10.0.0.2 on the 10.0.0.0/24 network and the source IP address will be 10.0.0.1.

The frame 1001 which is sent via the virtual network interface is encrypted by the service control apparatus 102 and given a Virtual Private Network (VPN) header, a User Datagram Protocol (UDP) header, an IP header, and an Ether header which can be routed via a physical network. Further, the frame 1001 is encapsulated into a frame 1002. A destination IP address of the frame 1002 is set to 61.2.2.1 and a source IP address is set to 192.168.1.1.

Then, the service control apparatus 102 sends the frame 1002 via the NETIF 204. Since the frame 1002 is routable via the physical network, the frame 1002 is sent to the service control apparatus 102A which is connected to the LAN 101B, through the LAN 101A and the Internet 100. An external header portion of the frame 1002 for capsulation is rewritten into a form that is adapted to each network on the way as the frame 1002 passes through a router, etc. and sent over to the service control apparatus 102A connected to the LAN 101B. For example, when the frame 1002 passes through a gateway having an IP address of 61.1.1.1, its source IP address is rewritten from 192.168.1.1 to 61.1.1.1 using network address translation (NAT). After that, when the frame 1002 passes through a gateway having an IP address of 61.2.2.1, the destination IP address is rewritten from 61.2.2.1 to 192.168.2.1 using NAT.

Then, the service control apparatus 102A receives the frame 1002 through the NETIF 204. The service control apparatus 102A processes the UDP header, the IP header, and the Ether header which can be routed via a physical network and are included in the frame 1002. The destination IP address of the frame 1002 is 192.168.2.1 and the source IP address is 61.1.1.1.

When the service control apparatus 102A determines that the VPN header is placed at the beginning of the frame 1002, it decapsulates and decrypts the frame 1002 according to the VPN header. Then the frame 1002 is transformed into a frame 1003 after decapsulation and decryption are completed. The service control apparatus 102A passes the frame 1003 to a virtual network interface. After that, the service control apparatus 102 receives the frame 1003 via the virtual network interface. The destination IP address of the frame 1003 is 10.0.0.2 and the source IP address is 10.0.0.1. In this way, communication is established in a logic network space between the service control apparatuses 102 and 102A through a virtual network interface.

A capsulation method of the present embodiment is only an example and Transmission Control Protocol (TCP) can also be used as a protocol for the transport layer, and IPv6 can be used as a protocol for the network layer. Further, an encoding method is not limited to the method of the present embodiment, and methods such as Advanced Encryption Standard (AES), Data Encryption Standard (DES), or Triple Data Encryption Standard (Triple DES) can also be used. Further, Internet Protocol security (IPsec) can be used together with the network layer protocol, and Secure Socket Layer (SSL) can be used together with the transport layer protocol.

Figure 11:
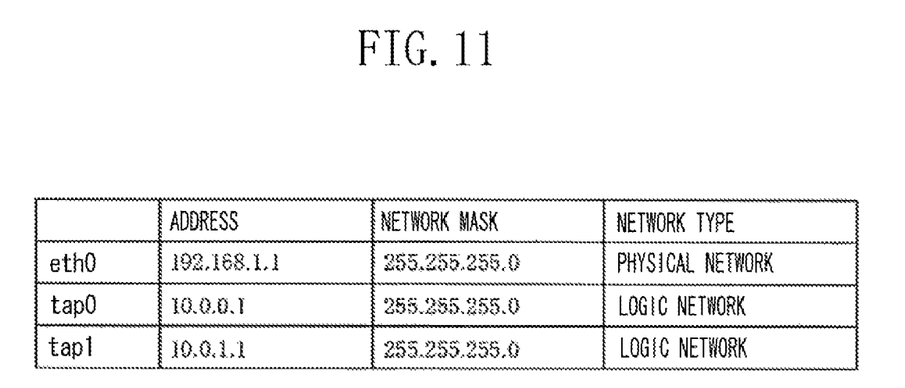
FIG. 11 is a chart illustrating interface names and network information.

FIG. 11 is a chart illustrating interface names and network information. "eth0" is a network interface corresponding to the physical network with an IP address of 192.168.1.1 and a network mask of 255.255.255.0. An interface corresponding to a first logic network (logic network space 10.0.0.0/24) is "tap0", its address is 10.0.0.1 and its network mask is 255.255.255.0. An interface corresponding to a second logic network (logic network space 10.0.1.0/24) is "tap1", its address is 10.0.1.1 and its network mask is 255.255.255.0.

A case will be described where a physical network is a registered network with a control level of "1", and a logic network is a registered network with a control level of "3", according to the present embodiment.

When the service control apparatus 102 exposes a service performed by SSDP, provides a service by SOAP, and registers and gives notification by GENA to a physical network, the service control apparatus 102 uses the network interface "eth0". An IP address 192.168.1.1 is used for communication.

In other words, a service is exposed by SSDP to a physical network in the address space of 192.168.1.0/24. Further, a service is provided by SOAP according to a request from an apparatus with an address in the address space of 192.168.1.0/24. Furthermore, a notification of a service is provided by GENA if a state of a registered apparatus having an address in an address space of 192.168.1.0/24 is changed.

In addition, the service control apparatus 102 restricts an exposure of a service by SSDP to a logic network in a logic network space of 10.0.0.0/24. In other words, an exposure of a service by SSDP is restricted to the logic network in the address space of 10.0.0.0/24. Further, the service control apparatus 102 permits a provision of a service by SOAP and a registration and a notification of a service by GENA. In these cases, a network interface "tap0" and an address 10.0.0.1 are used for communication.

In a case where a provision of a service by SOAP and a registration or a notification of a service by GENA are to be restricted, a provision of a service by SOAP is restricted with respect to a request from an apparatus having an address in an address space of 10.0.0.0/24. Further, when a state of the registered apparatus changes, a notification of a service by GENA to the registered apparatus having an address in the address space of 10.0.0.0/24 will be restricted.

When the service control apparatus 102 is connected to a plurality of physical networks, a physical network in use is determined according to a network interface being used. Further, when the service control apparatus 102 is connected to a plurality of logic networks, a logic network in use is determined according to a network interface being used. For example, in the case of FIG. 11, the service control apparatus 102 uses one of a virtual network interface for "tap0" which corresponds to the logic network space 10.0.0.0/24, and a virtual network interface for tap1 which corresponds to the logic network space 10.0.1.0/24. According to the present embodiment, a number of physical networks and logic networks to which the service control apparatus is connected is not limited.

As described above, the service control apparatus (service publication restriction apparatus) 102 has the NETIF 204 which is used to connect the service control apparatus 102 to a network. Further, the service control apparatus 102 includes the CPU 201 which restricts an exposure of a service for each address space of a connected network.

Furthermore, the network determination unit 303 of the service control apparatus 102 determines an address space of a connected network, and the service control unit 301 restricts an exposure of a service for each address space of the connected network.

Subsequent steps of the present embodiment are the same as those of the second exemplary embodiment.

The present invention can be also achieved by supplying a recording medium for recording a program code of software which is configured to realize a function of the above-described exemplary embodiments to a system or an apparatus and reading out and executing the program code stored in the recording medium by a computer (or CPU or MPU) of the system or the apparatus. In this case, the program code read out from the recording medium itself realizes the functions of the above-described exemplary embodiments and the recording medium which stores the program code also falls within the scope of the present invention.

A recording medium for storing the program code includes, for example, a floppy disk, a hard disk, an optical disk, a magneto-optical disk, a CD-ROM, a CD-R, a magnetic tape, a non-volatile memory card, a ROM, and a DVD.

The present invention is not limited to where functions of the above-described embodiments are implemented in which the program code is read out and executed by a computer. The program code is used together with an operating system (OS) on a computer to perform whole or apart of the actual processing. A case where the functions of the above-described exemplary embodiments are realized according to this processing is also included in the present invention.

Furthermore, the program read out of a recording medium can be written into a memory of a feature expansion board equipped in a computer or into a memory of a feature expansion unit connected to the computer. In this case, based on an instruction of the program, the CPU provided on the feature expansion board or the feature expansion unit can execute part or all of the processing so that the functions of the above-described embodiments can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-320247 filed Nov. 28, 2006 and Japanese Patent Application No. 2007-140568 filed May 28, 2007, which are hereby incorporated by reference herein in their entirety.

What is claimed is:

1. A service execution apparatus, comprising:
a connection unit configured to connect the service execution apparatus to a network to form a connected network;
a determining unit configured to determine whether a connecting apparatus which connects the connected network to another network is a registered apparatus registered with the service execution apparatus; and
a restriction unit configured to restrict an execution of a service requested from one or more other devices on the connected network based on a predetermined control level associated with the connecting apparatus registered with the service execution apparatus, in response to the determining unit determining that the connecting apparatus is a registered apparatus,
wherein the restriction unit inhibits the execution of the service requested from the one or more other devices on the connected network, in response to the determining unit determining that the connecting apparatus is not a registered apparatus.

2. The service execution apparatus according to claim 1, wherein the restriction unit includes a storage unit configured to store information on a connecting apparatus, and wherein the determining unit determines whether the connecting apparatus which connects the connected network is a registered apparatus according to the information stored in the storage unit and information acquired from the connecting apparatus which connects the connected network.

3. The service execution apparatus according to claim 2, wherein the storage unit stores address information of at least one registered router, and the determining unit determines whether a router of the connected network is a registered apparatus according to address information of the router of the connected network and the address information of the at least one registered router stored in the storage unit.

4. The service execution apparatus according to claim 1, wherein the restriction unit inhibits notification of a service type which can be executed by the service execution apparatus, in response to the determining unit determining that the connecting apparatus is not a registered apparatus.

5. The service execution apparatus according to claim 4, wherein, in response to the determining unit determining that the connecting apparatus is a registered apparatus, the restriction unit restricts the notification of the service type based on a predetermined control level associated with the connecting apparatus registered with the service execution apparatus.

6. The service execution apparatus according to claim 1, further comprising: a start unit configured to start a service in response to the determining unit determining that the connecting apparatus is a registered apparatus.

7. The service execution apparatus according to claim 1, wherein, in response to the determining unit determining that the connecting apparatus is a registered apparatus, the restriction unit restricts execution of a service based on a predetermined control level associated with the connecting apparatus registered with the service execution apparatus.

8. The service execution apparatus according to claim 1, wherein the connection unit physically connects the service execution apparatus directly to the connected network, and the determining unit determines whether the connecting apparatus on the physically connected network is a registered apparatus.

9. The service execution apparatus according to claim 1, wherein the service execution apparatus is configured to provide a service and control a service protocol that enables advertisement of a presence of the service, provision of the service, and status notification of the service, wherein, in response to the determining unit determining that the connecting apparatus is a registered apparatus associated with a predetermined control level registered in the service execution apparatus, the restriction unit inhibits at least one of advertisement, provision, and status notification of the service to the connected network while allowing at least one of advertisement, provision, and status notification of the service to the connected network.

10. The service execution apparatus according to claim 9, wherein the service is an image capturing and exposing service and, in response to the determining unit determining that the connecting apparatus is a registered apparatus associated with a predetermined control level registered in the service execution apparatus, the restriction unit inhibits advertisement of the presence of the service to the connected network but permits provision of the service and status notification of the service directly to the connected network.

11. A method for a service execution apparatus connected to a connected network, the method comprising:
    determining whether a connecting apparatus which connects the connected network to another network is a registered apparatus registered with the service execution apparatus;
    restricting an execution of a service requested from one or more other devices on the connected network based on a predetermined control level associated with the connecting apparatus registered with the service execution apparatus, in response to the determining unit determining that the connecting apparatus is a registered apparatus; and
    inhibiting the execution of the service requested from the one or more other devices on the connected network, in response to determining that the connecting apparatus is not a registered apparatus.

12. The method according to claim 11, further comprising: connecting the service execution apparatus physically to the connected network, wherein determining includes determining whether the connecting apparatus on the physically connected network is a registered apparatus.

13. The method according to claim 11, wherein determining includes determining whether a router of the connected network is a registered router according to address information of the connected router of the connected network and address information of at least one registered router stored in the service execution apparatus.

14. A non-transitory computer-readable storage medium storing a computer-executable program configured to perform a method to restrict an execution of a service by a service execution apparatus connected to a connected network, the method comprising:
    determining whether a connecting apparatus which connects the connected network to another network is a registered apparatus registered with the service execution apparatus;
    restricting an execution of a service requested from one or more other devices on the connected network based on a predetermined control level associated with the connecting apparatus registered with the service execution apparatus, in response to the determining unit determining that the connecting apparatus is a registered apparatus; and
    inhibiting the execution of the service requested from the one or more other devices on the connected network, in response to determining that the connecting apparatus is not a registered apparatus.

* * * * *